United States Patent
Kunberger et al.

(12) 
(10) Patent No.: US 11,199,274 B2
(45) Date of Patent: Dec. 14, 2021

(54) SAFETY SYSTEM FOR A PRESSURE VESSEL OF A MOTOR VEHICLE

(71) Applicant: Bayerische Motoren Werke Aktiengesellschaft, Munich (DE)

(72) Inventors: Jan-Mark Kunberger, Munich (DE); Andreas Pelger, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 39 days.

(21) Appl. No.: 16/363,547

(22) Filed: Mar. 25, 2019

(65) Prior Publication Data

US 2019/0219187 A1 Jul. 18, 2019

Related U.S. Application Data

(63) Continuation of application No. PCT/EP2017/070297, filed on Aug. 10, 2017.

(30) Foreign Application Priority Data

Sep. 28, 2016 (DE) ...................... 10 2016 218 692.2

(51) Int. Cl.
   *F16K 17/38* (2006.01)
   *F16K 31/00* (2006.01)
   (Continued)

(52) U.S. Cl.
   CPC ............ *F16K 17/383* (2013.01); *F16K 17/40* (2013.01); *F16K 31/002* (2013.01); *F16K 31/025* (2013.01); *F17C 13/04* (2013.01); *F17C 13/123* (2013.01); *F17C 2205/0314* (2013.01); *F17C 2205/0317* (2013.01); *F17C 2205/0332* (2013.01); *F17C 2221/012* (2013.01); *F17C 2221/033* (2013.01);
   (Continued)

(58) Field of Classification Search
   CPC ...... F16K 17/383; F16K 17/40; F16K 31/002; F16K 31/025; F17C 2205/0314
   USPC .......................................... 137/72
   See application file for complete search history.

(56) References Cited

U.S. PATENT DOCUMENTS 8,235,249 B2 * 8/2012 Hollars ................. F16K 17/403
   222/5
8,910,651 B2 * 12/2014 Heise .................... F16K 17/406
   137/72

(Continued)

FOREIGN PATENT DOCUMENTS

CN 101984537 A 3/2011
CN 102343820 A 2/2012

(Continued)

OTHER PUBLICATIONS

International Search Report (PCT/ISA/210) issued in PCT Application No. PCT/EP2017/070297 dated Nov. 3, 2017 with English translation (four(4)pages).

(Continued)

*Primary Examiner* — P. Macade Nichols
(74) *Attorney, Agent, or Firm* — Crowell & Moring LLP

(57) ABSTRACT

A thermally activatable safety valve has at least one microwave transmitter and microwave transmitter component. The microwave transmitter and/or the microwave transmitter component is designed to heat at least one thermally activatable opening element.

14 Claims, 2 Drawing Sheets

(51) Int. Cl.
*F16K 31/02* (2006.01)
*F17C 13/12* (2006.01)
*F16K 17/40* (2006.01)
*F17C 13/04* (2006.01)

(52) U.S. Cl.
CPC ............... *F17C 2223/0123* (2013.01); *F17C 2223/0161* (2013.01); *F17C 2223/033* (2013.01); *F17C 2223/036* (2013.01); *F17C 2270/0168* (2013.01); *F17C 2270/0184* (2013.01)

(56) References Cited

U.S. PATENT DOCUMENTS

| | | | |
|---|---|---|---|
| 10,359,150 | B2 | 7/2019 | Pelger et al. |
| 2008/0236668 | A1* | 10/2008 | Beerling ............... F16K 31/025 137/2 |
| 2009/0189102 | A1 | 6/2009 | Linden |
| 2010/0122735 | A1* | 5/2010 | Schramm ............ F16K 17/1613 137/68.19 |
| 2015/0270717 | A1 | 9/2015 | Fujimaki et al. |

FOREIGN PATENT DOCUMENTS

| | | |
|---|---|---|
| CN | 104953717 A | 9/2015 |
| CN | 105874262 A | 8/2016 |
| DE | 10 2011 114 725 A1 | 4/2013 |
| DE | 10 2014 000 616 A1 | 7/2015 |
| DE | 10 2016 218 691 A1 | 6/2017 |
| DE | 10 2016 215 053 A1 | 2/2018 |
| EP | 1 655 533 B1 | 5/2006 |

OTHER PUBLICATIONS

German-language Written Opinion (PCT/ISA/237) issued in PCT Application No. PCT/EP2017/070297 dated Nov. 3, 2017 (four(4)pages).
German-language Search Report issued in counterpart German Application No. 10 2016 218 692.2 dated Jun. 9, 2017 with partial English translation (10 pages).
Chinese-language Office Action issued in counterpart Chinese Application No. 201780059559.3 dated Sep. 26, 2019 with English translation (19 pages).

* cited by examiner

SAFETY SYSTEM FOR A PRESSURE VESSEL OF A MOTOR VEHICLE

CROSS REFERENCE TO RELATED APPLICATIONS

This application is a continuation of PCT International Application No. PCT/EP2017/070297, filed Aug. 10, 2017, which claims priority under 35 U.S.C. § 119 from German Patent Application No. 10 2016 218 692.2, filed Sep. 28, 2016, the entire disclosures of which are herein expressly incorporated by reference.

BACKGROUND AND SUMMARY OF THE INVENTION

The present invention relates to a safety system for a pressure container of a vehicle, and to a vehicle having the safety system. Further, the technology disclosed herein relates to a method for remotely releasing pressure in a pressure container.

In vehicles, pressure containers are used to store fuel, for example hydrogen or natural gas. The fuel is converted in a fuel cell or a combustion engine in the vehicle in order to produce energy to drive the vehicle. Pressure containers are under relatively high pressure. As a rule, pressure from the pressure container is released in controlled fashion during thermal events such as a vehicle fire, for example. Appropriate safety valves are provided to this end. The prior art has disclosed safety valves with different opening elements which are embodied, e.g., as glass ampoules, from fusible solder or from a shape-memory metal.

It is an object of the present invention to provide a safety system for a pressure container in a vehicle that, expediently, is easy to operate, cost effective, low-weight and/or space-saving, and preferably facilitates a reliable activation of the safety valve for releasing the pressure from the pressure container. The object is achieved by the features of the claimed invention.

The technology disclosed herein relates to a thermally activatable safety valve. As a rule, the thermally activatable safety valve, also referred to as a thermal pressure release device, TPRD, is provided adjacent to the pressure container. In the case of exposure to heat (e.g., from flames), the fuel stored in the pressure container is vented to the surroundings by the TPRD. The pressure release device vents the fuel as soon as the trigger temperature of the TPRD is exceeded (=thermal activation). Further, trigger lines may be provided. By way of example, such a system for thermal pressure release is disclosed in DE 10 2011114725 A1 or EP 1 655 533 B1.

The safety valve has at least one thermally activatable opening element. In the case of thermal activation, usually at a trigger temperature of approximately 110° C. and more, the opening elements change their shape or are destroyed. The safety valve opens as a result. The opening element can change its shape as a result of the thermal activation. As an alternative or in addition thereto, the opening element can be destroyed by the thermal activation. Within the technology disclosed here, the term "opening element" is restricted to the region of the safety valve that is changeable in terms of its shape or destroyable by the thermal activation. In the closed state of the safety valve, the opening element directly or indirectly causes the safety valve not to release a flow path from the interior of the pressure container to the surroundings. By way of example, in the case of an indirect seal, the opening element holds a valve body, with the valve body, in turn, sealing the safety valve.

The opening element is embodied in such a way that it opens at a trigger temperature, for example at 110° C. The trigger temperature is chosen in such a way that rupturing of the pressure container as a result of structural weakening due to heat is avoided in the case of a thermal event, e.g., a vehicle fire. By way of example, the opening element can be embodied as a glass ampoule. Such a glass ampoule is a fluid-filled rupturing body. The glass ampoule has a closed fluid volume which is surrounded by material that is comparatively brittle or breakable (e.g., glass), even at the trigger temperature. The material for the glass ampoule is not restricted to "glass"; instead, any material that is sufficiently brittle may be chosen. The fluid volume is filled with a fluid that expands comparatively strongly in the case of heat. If the temperature now rises to the trigger temperature, the glass ampoule breaks and consequently causes the safety valve to be triggered (=release of the flow path to the surroundings).

As an alternative or in addition thereto, provision can be made for fusible solder. If the temperature in the safety valve increases to the trigger temperature, the fusible solder becomes soft. The softened fusible solder is deformed by a force that is produced directly or indirectly by the internal pressure of the pressure container. This deformation of the fusible solder causes the safety valve to be triggered. Further, the opening element may also comprise a shape-memory material, in particular a shape-memory wire. In particular, the shape-memory material can be embodied to adopt a first shape at a temperature below the trigger temperature, said first shape differing from the second shape that sets-in once the trigger temperature has been exceeded. Specific embodiments of the safety valve with a glass ampoule, a fusible solder and/or a shape-memory material are known to a person skilled in the art. By way of example, DE 10 2014 000616 A1 discloses a safety valve with a shape-memory material and, in introductory part, likewise discusses solutions with a glass ampoule and a fusible solder.

The safety valve comprises at least one microwave transmitter component. Here, the term "at least one microwave transmitter component" comprises:

at least one or more (or all) component(s) of a microwave transmitter, or at least one or more (or all) component(s) of a plurality of microwave transmitters.

The at least one microwave transmitter component is therefore a constituent part of at least one microwave transmitter.

The microwave transmitter or the microwave transmitter component is embodied or provided to directly and/or indirectly heat the at least one thermally activatable opening element. In particular, the microwave transmitter or the microwave transmitter component can be embodied to emit electromagnetic waves in a frequency range from 1 to 300 GHz.

In particular, the microwave transmitter component can be an electrical coil that is embodied to emit microwaves. Further components of the microwave transmitter likewise can be assembled together with the coil to form a complete microwave transmitter as a modular unit. It is likewise contemplated for the at least one first microwave transmitter component to be provided on or in the safety valve or directly adjacent thereto (=proximally to the safety valve) and for the at least one second component of the microwave transmitter to be provided at a different location in the motor vehicle (in particular, distally to the safety valve, i.e., further away than the proximal first microwave transmitter component) and/or external to the vehicle.

In particular, the first and second microwave transmitter components or the motor vehicle can be configured in such a way that the distal microwave transmitter components or vehicle-external microwave component can interact with the proximal microwave transmitter component so that the proximal microwave component emits microwaves. The distal vehicle-internal or vehicle-external microwave components can interact with the proximal microwave transmitter component in wireless or wire-linked fashion. Preferably, an electric circuit is configured to this end by way of the connectors disclosed herein.

Preferably, at least a part of the circuit that produces the microwaves can be carried along in mobile fashion outside and independently of the motor vehicle, for example in service vehicles, rescue vehicles, servicing workshops, etc. Consequently, it may be possible to reduce outage probability, installation space requirements, weight and/or component costs.

Preferably, the microwave transmitter or the microwave transmitter component is provided in or on the safety valve, or immediately adjacent thereto. In one configuration, the microwave transmitter or the microwave transmitter component can be attached to the external housing of the safety valve or directly adjacent thereto. In this context, directly adjacent means that the microwaves of the microwave transmitter or the microwave transmitter component are still able to act with sufficient strength on the safety valve in order to heat the opening element or the further portions, disclosed herein, to a temperature above the trigger temperature. The microwave transmitter or the microwave transmitter component produces the heat in the interior of the opening element. Consequently, the opening element can be actuated (i.e., broken, fused or deformed) particularly quickly. Hence, the pressure release can be introduced particularly quickly.

The microwave transmitter or the microwave transmitter component can be embodied and arranged in such a way that the microwave transmitter or the microwave transmitter component is able to heat at least one further portion of the safety valve. By way of example, the microwave transmitter can heat a housing portion of the safety valve whose inner surface faces the external surface of the opening element. As an alternative or in addition thereto, the microwave transmitter or the microwave transmitter component can heat portions of the safety valve that position the opening element. Consequently, additional heat can be introduced into the opening element by thermal radiation and/or thermal conduction. However, the further portion is not the opening element. Such a configuration causes the opening element to be able to be triggered even more quickly by the microwave transmitter or the microwave transmitter component.

The technology disclosed herein relates to a safety system for releasing pressure in at least one pressure container of a motor vehicle. The safety system comprises the safety valve disclosed herein and the at least one pressure container disclosed herein.

By way of example, the pressure container can be a cryogenic pressure container (=CcH2) or a high-pressure gas container (=CGH2). High-pressure gas containers are embodied to permanently store fuel at a nominal working pressure (NWP) of approximately 350 bar (gauge) (=positive pressure in relation to atmospheric pressure), further preferably of approximately 700 bar (gauge) or more, substantially at ambient temperatures. A cryogenic pressure container is suitable for storing the fuel at the aforementioned working pressures, even at temperatures that lie significantly below the working temperature of the motor vehicle.

Expediently, the safety valve is arranged on the pressure container or correspondingly connected to the pressure container in fluid-conducting fashion. The safety valve is closed provided no thermal event is present.

The safety system disclosed herein can be embodied in such a way, in particular, that the at least one microwave transmitter or microwave transmitter component can be supplied with electrical power by a vehicle-internal and/or a vehicle-external energy source.

By way of example, the vehicle-internal energy source can be an electrical energy storage device (e.g., a battery) or thermoelectric generator. Advantageously, the thermoelectric generator can be arranged directly adjacent to the lateral face of the pressure container. The thermoelectric generator can be embodied in the form of the generator disclosed in the German patent application with the application number DE 10 2016 215053.7 (therein: thermoelectric generator 110). In respect of the configuration and arrangement of the thermoelectric generator, the content of the German patent application with the application number DE 10 2016 215053.7 is incorporated by reference herein.

In particular, the microwave transmitter/microwave transmitter component disclosed herein may be activatable by a vehicle-external energy source and/or by a vehicle-external controller. Furthermore, provision can be made for the safety system to be configured in such a way that the microwave transmitter or the microwave transmitter component is connectable to the vehicle-external energy source and/or to a vehicle-external controller. The vehicle-external energy source can be any type of electrical energy source, for example a battery. The vehicle-external energy source can be configured to supply the microwave transmitter or the microwave transmitter component with sufficient amounts of energy so that the microwave transmitter or the microwave transmitter component thermally activates the opening element. The vehicle-external controller can be configured to control or regulate the safe actuation of the remote pressure release device. Expediently, electrical lines can lead to at least one connector for such an energy source or of for such a controller. However, only one electric line may be provided, for example if only one pole is required for control and if the ground signal or ground is used as the other signal. The specific configuration of the circuit is known to a person skilled in the art.

Particularly preferably, at least two electrical connectors are provided at a distance from one another at different points of the motor vehicle disclosed herein, the vehicle-external energy source and/or the vehicle-external controller being respectively connectable thereto. By way of example, at least one electrical line, preferably two electrical lines, can lead to each of these connectors.

In the context of the technology disclosed herein, "at a distance from one another" means that the electrical connection points are spaced apart from one another by at least 50 cm, preferably at least 1 m or 1.5 m. They can be spaced apart in such a way that the electrical connectors are accessible from the outside from different directions and/or from different vehicle sides (right vehicle side, left vehicle side, vehicle base, vehicle roof, etc.).

In this context, accessible from the outside means that the at least one electrical connector is accessible from outside of the motor vehicle (e.g., from the outer skin of the body or from the underbody shield) without vehicle-specific specialist tools and without a time-consuming disassembly of further functional components (apart from covers of the body). Here, the electrical connector can be covered by a flap or cover, which, expediently, is easily disassemblable.

As an alternative or in addition to the connectors, provision can be made for microwaves emitted by the vehicle-external microwave transmitter or by the at least one vehicle-external microwave transmitter component to be received by at least one distal vehicle-side microwave transmitter component (a coil, in particular). Preferably, at least two distal vehicle-side microwave transmitter components can be provided at a distance from one another at different points of the motor vehicle disclosed herein.

Here, the second or distal vehicle-side coil is a coil that is installed in the motor vehicle, which is further away from the safety valve than a first or proximal vehicle-side coil. Then, the proximal vehicle-side coil can be the vehicle-side microwave transmitter component that is able to thermally activate the safety valve or the opening element. Expediently, the distal and proximal coil are connected to one another by way of at least one electrical conductor. Consequently, the microwaves can be transferred from the distal coil to the proximal coil.

Then, preferably, a vehicle-external microwave transmitter (component) is an excitation coil which transfers microwaves to the distal vehicle-side coil, wherein the outer skin of the body can be arranged between the coils. The transfer of the microwaves can be implemented by electromagnetic waves. Expediently, the outer skin is manufactured from a plastics material in this region. Advantageously, an excitation coil can be attached directly to the outer side of the vehicle body (e.g., mechanically, by way of suction cups, magnets, etc.). Consequently, the time for disassembling possible body paneling in order to reach the electrical connectors is dispensed with during rescue/recovery. At the same time, the configuration of the body outer skin is not impaired by possible electrical connectors for the safety system. Since no microwave transmitter is required on the vehicle side, the costs and the outage probability on the vehicle-side are reduced.

Preferably, the safety system disclosed herein further comprises an electrical switch or a crash switch or an electrical switching apparatus (below: electrical switch). Here, the electrical switch is opened in the current-free state. The electrical switch can be arranged and embodied in such a way that the electrical switch suppresses an electrical contact to the microwave transmitter or microwave transmitter component for as long as there is no signal that is indicative for an accident/fire event and/or a vehicle-external signal from authenticatable third parties. If a controller of the motor vehicle or the electrical switching apparatus identifies that the motor vehicle is involved in an accident and/or that a fire event has occurred in the motor vehicle and/or if the controller authenticates an authorized third party (who initiates a closing signal for the electrical switch), the electrical switch is closed and a current supply to the microwave transmitter or to the microwave transmitter component is facilitated. Thus, the electrical switch is an electrical switch that is actuatable by a controller of the motor vehicle. The apparatuses for identifying a crash of a vehicle are usually present and also used to trigger other safety systems, for example an airbag. This can avoid a misuse of the system.

The electrical switch can also be activated by way of a vehicle-external signal (e.g., rescue forces, servicing staff). That is to say, the electrical switch can also be closed by authorized (in particular, authenticated) third parties (e.g., staff at a servicing site) without a vehicle fire or an accident or crash signal being present on the vehicle side. This is particularly advantageous if a pressure release should occur for other reasons, for example because the controller was deactivated during a vehicle fire or a crash (e.g., when parked) and/or the controller has not detected/classified the fire/accident as such. Other reasons are also possible. Advantageously, the electrical switch can be closed by way of a wireless or wire-linked communication signal from a vehicle-external apparatus, for example by an E-Call system of a servicing point. In principle, any form of communication is contemplated here.

Preferably, additional safety measures may be provided for authenticating the third-party closing the electrical switch, for example an encrypted communication, secured by a motor-vehicle-specific mechanical or electronic key. By way of example, the code of the vehicle key can also be used to this end. Particularly advantageously, an internal energy source is provided in this configuration. However, in addition or as an alternative thereto, an external energy source may also be provided.

In particular, an apparatus can be embodied to implement the method disclosed in the German patent application with the application number 10 2015 223 966.7. The apparatus disclosed in the German patent application with the application number 10 2015 223 966.7 and the method disclosed therein are herewith incorporated by reference herein. However, the thermal (remote) activation is preferably realized here by means of the microwave transmitter/microwave transmitter components disclosed herein.

The technology disclosed herein further comprises a motor vehicle, in particular a road vehicle. The motor vehicle comprises the safety system disclosed herein and at least one pressure container as disclosed herein. The safety system is configured to bring about a pressure release of the pressure container disclosed herein.

The safety system disclosed herein can comprise at least one delay device. The delay device can be provided on the vehicle side. As an alternative or in addition thereto, the delay device can also be provided on the vehicle-external energy source or on the vehicle-external controller. The delay device is configured to delay the operation of the microwave transmitter or the microwave transmitter component in time. The technical implementation of such a delay device is known to a person skilled in the art. In control engineering, the term "lag element" is also used herefor. The delay device disclosed herein can delay the thermal trigger of the opening element by at least 30 seconds, at least 2 minutes or at least 5 minutes. Advantageously, this consequently allows safety staff to retreat a safe distance before releasing the opening element. Consequently, there advantageously is no need to lay long electrical lines for a trigger from a safe distance. Preferably, the delay device can be designed in such a way that the delay time can be set. Consequently, the intended time of the remote pressure release can be set, like in the case of a delayed-action shutter release of a photo camera.

The technology disclosed herein further relates to a method for releasing pressure in a pressure container, in particular in the pressure container disclosed herein. Here, the thermally activatable opening element of the safety valve disclosed herein can be heated to its trigger temperature by the microwave transmitter or the microwave transmitter component for the purposes of releasing the pressure.

In one configuration, at least one vehicle-external microwave transmitter or at least one vehicle-external microwave transmitter component can be used for heating the opening element or the safety valve to the trigger temperature. In particular, the opening element or the safety valve can then be configured (in particular embodied and/or arranged) in such a way that it can be thermally activated by a vehicle-external microwave transmitter.

To this end, such a safety valve can be arranged adjacent to the outer skin of the body and/or adjacent to the underbody panel and/or at any other easily accessible point of the motor vehicle.

As an alternative or in addition thereto, provision can be made for the method to comprise the step:

according to which the microwaves emitted by the vehicle-external microwave transmitter or by the at least one vehicle-external microwave transmitter component are received by at least one distal vehicle-side coil, and according to which the microwaves are transferred from the distal vehicle-side coil to at least one proximal vehicle-side coil.

The method may comprise the step according to which the at least one vehicle-external microwave transmitter/microwave transmitter component is arranged on the motor vehicle in such a way that the former can thermally activate the safety valve or the opening element directly and/or indirectly by way of microwaves.

The method disclosed herein may comprise the step according to which at least one further portion of the safety valve is heated for the purposes of releasing pressure or for the purposes of thermally triggering the opening element. The method disclosed herein may comprise a step according to which a fusible solder, a glass ampoule and/or a shape-memory material is heated to the trigger temperature. The method disclosed herein may comprise the steps according to which an accident event and/or a vehicle fire is detected and according to which the electrical switch disclosed herein is transferred from an open position into a closed position when an accident event and/or a vehicle fire was detected. The method disclosed herein may comprise the step according to which the heating of the opening element after an electric circuit was closed is delayed, in particular by way of a delay device. The method disclosed herein may comprise the step according to which at least one thermoelectric generator generates electrical energy by way of a thermal event, said electrical energy being used by the microwave transmitter or the microwave transmitter component to heat the opening element to the trigger temperature.

The method disclosed herein, the safety system shown here and the vehicle according to the invention facilitate a thermal activation of the safety valve on the pressure container without additional components, and hence without additional installation space. There is no need for additional electrical heating, any pyrotechnic elements or any hydraulic apparatuses.

Expressed differently, the technology disclosed herein relates to the activation of a TPRD trigger mechanism by way of a microwave transmitter or a microwave transmitter component, the coil of which is expediently attached in the vicinity of the glass flask and/or solder. The microwaves act on the liquid glass flask and/or on the solder and heat the latter to the trigger temperature. Further, the microwaves can also act on the housing surrounding the glass flask or solder and heat the latter. As a result, the trigger mechanism (glass flask or solder) is heated by thermal conduction and/or thermal radiation. Additionally, the microwave coil may advantageously not be arranged within the housing. This is particularly advantageous if this relates to a retrofitting solution. The electrical actuation can be implemented by way of a safety switch, which only releases the actuation of the microwave transmitter or the microwave transmitter component once the vehicle controller has identified an accident or a fire. As an alternative or in addition thereto, third parties (rescue forces, as a rule) may release the microwave transmitter or the microwave transmitter component, for example by way of the electrical switch disclosed herein or by way of the disclosure of the German patent application with the application number 10 2015 223 966.7, which is incorporated by reference herein.

Microwave transmitters are very simple electronic circuits. The activation of the microwave transmitter or microwave transmitter component could also be implemented automatically after a time delay once the power supply has been connected. By way of example, this renders a direct connection of a battery to the vehicle possible, i.e., without additional cables or activation switches. After connection, the rescue/recovery staff have sufficient time to retreat from the danger zone.

The proposed remote pressure release can be integrated with significantly less outlay into available and secured TPRD systems, without demanding changes to the design and functionality of the secured TPRD systems in the process. Consequently, it is still possible to continue to use tested TPRD systems, although these can now also be actuated remotely, in particular from outside of the motor vehicle. Moreover, as a rule, the system disclosed herein can be realized in a comparatively cheap and simple fashion, and with low installation space requirements.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
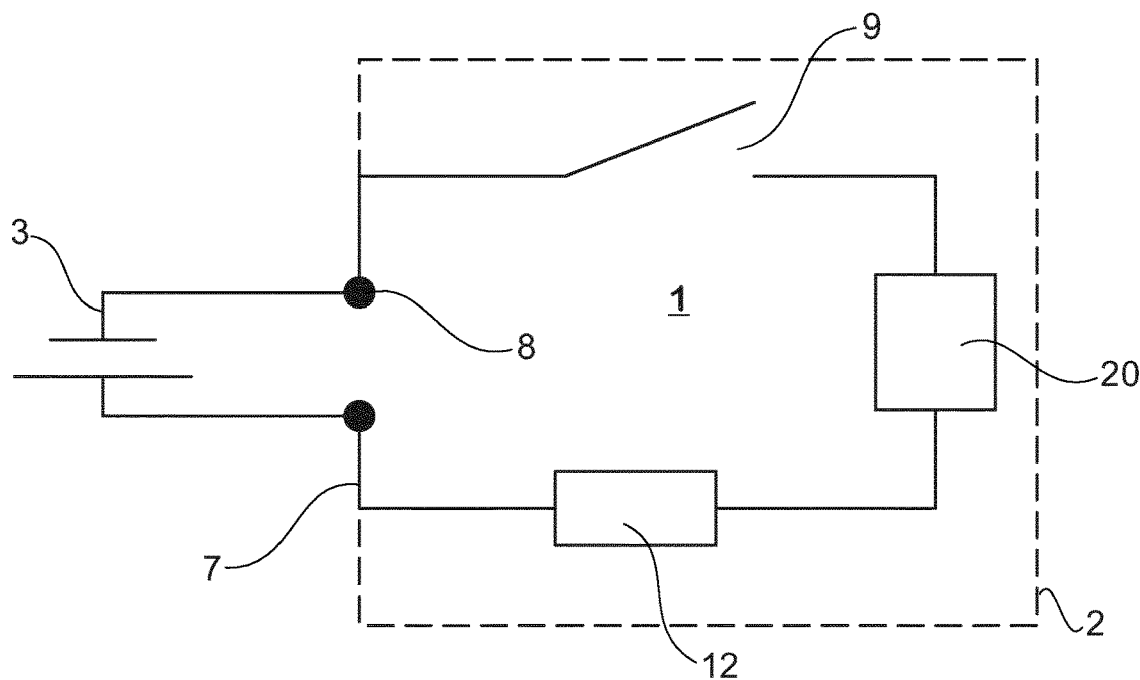
FIG. 1 is a schematic diagram of a circuit of the safety system 1 of a motor vehicle 2 having the safety valve 5.

FIG. 1 schematically shows a circuit in which the technology disclosed herein is realized. The motor vehicle 2 is labeled using dashed lines. The connector 8 is provided so as to be easily accessible from the outside. By way of example, the connector 8 can be provided behind a flap of the body outer skin or on the underbody panel. The connector 8 is embodied in such a way that a vehicle-external energy source 3 is easily connectable. Only one connector 8 is illustrated here. Preferably, the motor vehicle 2 comprises at least two connectors 8, which are arranged to be accessible from the outside at different points on the vehicle 2. Advantageously, this consequently allows the external energy source 3 to be connected, independently of the vehicle position after an accident.

The external energy source 3 is connected to the microwave transmitter or the microwave transmitter component 20 by way of electrical lines 7. In this case, the microwave transmitter or the microwave transmitter component 20 is arranged on or in a safety valve 5 (safety valve 5 not shown; see FIG. 2). Here, the electrical lines 7, the vehicle-external energy source 3 and the microwave transmitter 20 form an electric circuit in which, additionally in this case, an electrical switch 9 that is embodied as a crash switch is provided.

The electrical switch 9 is open in the current-free state. If an accident or a vehicle fire is detected by a controller (not illustrated), the controller causes the electrical switch 9 to be closed. As an alternative or in addition thereto, safety staff can remotely activate the microwave transmitter or the microwave transmitter component 20.

Consequently, a current can only flow in the case of the connected external energy source 3 if an accident or vehicle fire is present. This measure can contribute to reducing the probability of a pressure release by misuse.

Further, the system disclosed here may comprise a delay device 12. The delay device 12 is configured to initially suppress the current flow for a certain amount of time directly after the formation of the closed circuit, even if the electric switch 9 is closed and the external energy source 3 is connected. Here, the delay device 12 is indicated as a separate component. The delay device 12 could likewise be integrated into another component (e.g., the microwave transmitter or microwave transmitter component, controller, etc.) as well. Consequently, the rescue forces, as a rule, have sufficient time to move out of the danger zone after they have connected the external energy source 3 to the connector 8 of the motor vehicle 2. However, such a delay device 12 need not be provided. It is likewise possible for the external energy source 3 to be connected to the connector 8 by way of long electrical lines, with the line length expediently being chosen in such a way that the external energy source is arranged outside of the danger region. Then, an external controller or an external switch that closes the circuit can be provided on the external energy source 3. Once the circuit is closed and an electric current flows after a certain delay by the delay device 12, the microwave transmitter or the microwave transmitter component 20 emits microwaves, which heat the heating element 6/10 of the safety valve 5 and, optionally, further regions of the safety valve 5. An external energy source 3 is illustrated here. However, naturally, a vehicle-internal energy source can be provided as an alternative or in addition thereto.

Figure 2:
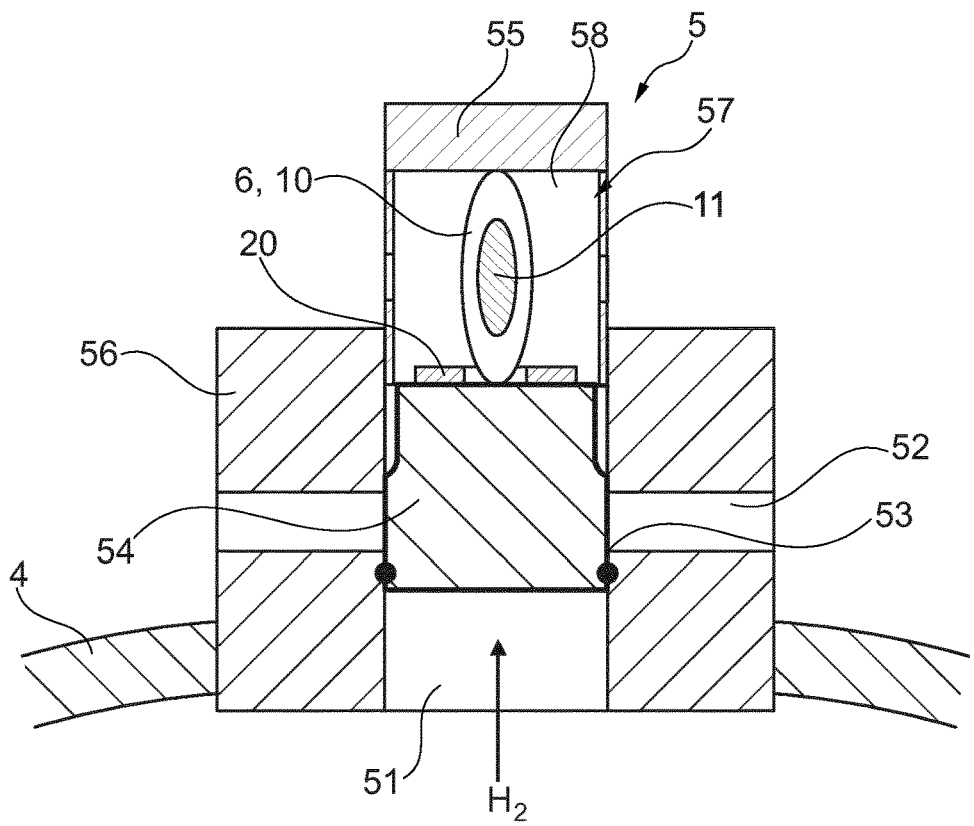
FIG. 2 schematically shows a cross-sectional drawing of a safety valve 5 with a microwave transmitter 20 and an open element 6.

FIG. 2 is a schematic cross-sectional view of the safety valve 5, which is provided in the pressure container 4. The fuel, hydrogen in this case, can flow into the safety valve 5 through an inlet 51. The piston 54 with seal 53 prevents the flow of fuel through the venting line 52. Here, the opening element 6 holds the piston 54 in its first position where it blocks the passage of fuel. The opening element 6 is placed under pressure. The piston 54 transmits a piston force exerted by the pressure container internal pressure onto the opening element 6. The counter pressure element 55 is connected to the housing 56 of the safety valve 5 by way of connecting rods 57 in this case. The counter pressure element 55 provides the counterforce to the piston force. The counter pressure element 55 and the connecting rods 57 are embodied in such a way that the heated air of the surroundings can easily flow into the valve chamber 58 in order to thermally activate the opening element 6 in a case of fire immediately adjacent to the safety valve 5. Now, if a fire event occurs at a different point of the motor vehicle or if an accident has occurred, the microwave transmitter or the microwave transmitter components 20 can be supplied with power such that the latter emits microwaves. The microwaves heat the fluid in the fluid space 11 and, optionally, further portions of the safety valve 5, such as the counter pressure element 55, the connecting rods 57 and/or portions of the housing 56, for example. If the temperature in the fluid space 11 exceeds the trigger temperature, the opening element 6, which is embodied as a glass ampoule 10, breaks. Consequently, only the piston force applied by the pressure container internal pressure acts on the piston 54. Thus, the piston 54 is displaced in the axial direction of the safety valve 5 toward the counter pressure element 55. As a result of this axial movement, the fuel can escape through the venting line 52 and pressure in the pressure container 4 is released.

Figure 3:
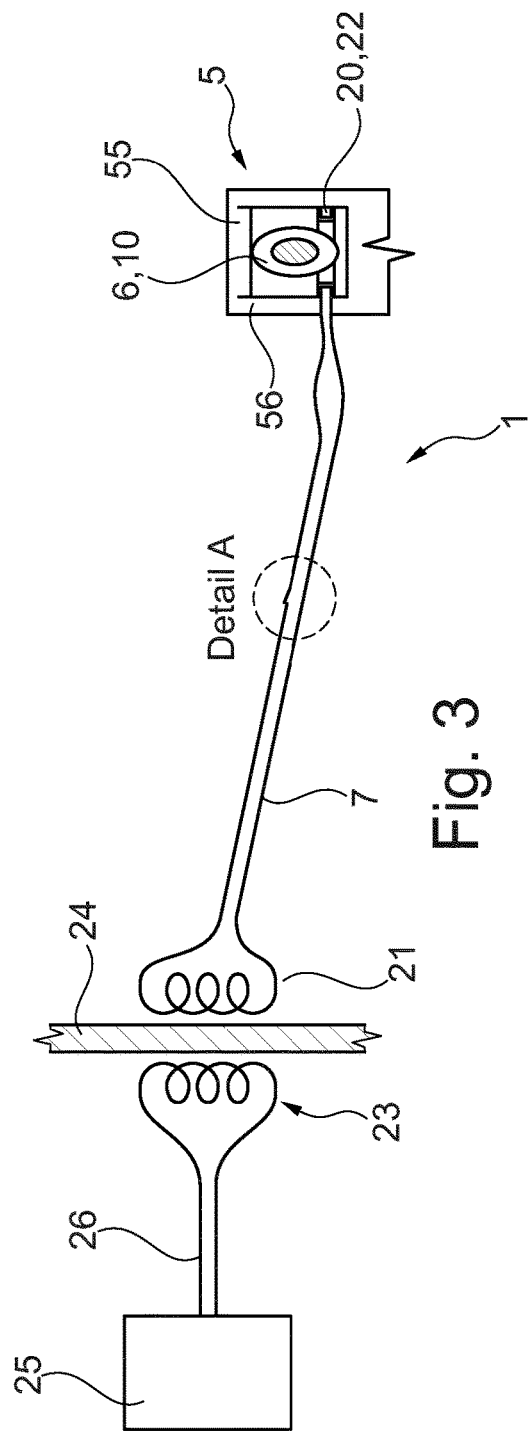
FIG. 3 schematically shows a further configuration of the circuit.
Figure 3A:
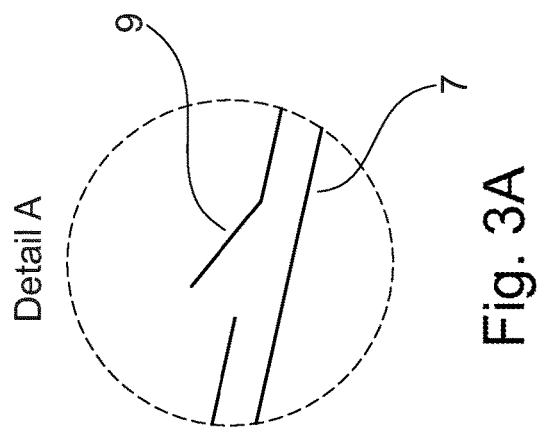
FIG. 3A is a magnified view of detail A in FIG. 3.

FIG. 3 shows a further configuration of the circuit of the safety system 1 disclosed herein. The safety valve 5 can be constructed as explained in conjunction with FIGS. 1 and 2. The at least one microwave transmitter component 20 is embodied as proximal or first coil 22 in this case. The coil 22 is configured to thermally activate the opening element 6, i.e., heat the latter to its trigger temperature. The proximal coil 22 is connected to the second or distal coil 21 by way of lines 7. The crash switch 9 disclosed herein can be integrated into this circuit (see FIG. 3A). The distal coil 21 can be situated at any suitable point in the outer region of the chassis. Preferably, the distal coil is immediately adjacent to the outer skin of the vehicle body 24 on the inner side of the latter, in particular such that electromagnetic waves emitted by a vehicle-external excitation coil 23 that is arrangeable on the outer side of the outer skin of the vehicle body 24 are able to excite the vehicle-side distal coil 21 on the inner side of the outer skin of the vehicle body 24. The vehicle body should not shield electromagnetic waves in this chassis or vehicle body region 24. Expediently, the vehicle body is formed from plastics in this region. The vehicle-external excitation coil 23 can be part of the vehicle-external microwave transmitter 25, which, in turn, can be configured to be operable from a safe distance by way of electrical lines 26.

Within the scope of the technology disclosed herein, the singular is sometimes used for simplifying purposes (e.g., "microwave transmitter", "microwave transmitter component"), with, as it were, the plural thereof (i.e., "at least one microwave transmitter", "at least one microwave transmitter component") likewise being intended to be comprised or disclosed and the plural not being explicitly repeated purely for reasons of readability.

Within the scope of the technology disclosed herein, "vehicle-external" means that the object denoted as "vehicle external" is not arranged in the motor vehicle or not permanently connected to the motor vehicle during its use as intended. Instead, it is a mobile component, or a component installed at a different location to the motor vehicle. However, a vehicle-external object can be connected to the motor vehicle for the intended use, for example for the duration of the use.

LIST OF REFERENCE SIGNS

1 Safety system
2 Vehicle
3 External electrical energy source
4 Pressure container
5 A safety valve
51 Inlet
52 Venting line
53 Seal
54 Piston
55 Counter pressure element
56 Housing
57 Connecting rod
6 Opening element
7 Electrical lines 8 Electrical connector
9 Crash switch
10 Glass ampoule
11 Fluid space
12 Delay device
20 Microwave transmitter or microwave transmitter component
21 Second/distal microwave transmitter component
22 First/proximal microwave transmitter component
23 Excitation coil
24 Vehicle body
25 Vehicle-external microwave transmitter
26 Electrical lines The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A thermally activatable safety valve, comprising:
   at least one microwave transmitter component; and
   at least one thermally activatable opening element of the safety valve, wherein
   the microwave transmitter component is configured to generate heat to heat the at least one thermally activatable opening element.

2. The safety valve as claimed in claim 1, wherein
   the microwave transmitter component is configured to heat at least one further portion of the safety valve, and
   the at least one further portion is configured and arranged such that the at least one further portion at least partly heats the thermally activatable opening element.

3. The safety valve as claimed in claim 1, wherein
   the thermally activatable opening element comprises one or more of:
   a fusible solder, a glass ampoule, and a shape-memory material.

4. A safety system for releasing pressure in at least one pressure container of a motor vehicle, comprising:
   at least one safety valve as claimed in claim 1, wherein the safety valve is configured to release the pressure.

5. The safety system as claimed in claim 4, further comprising:
   at least one electrical switch configured to interrupt a power supply of the microwave transmitter component for as long as there is no accident event, no vehicle fire, and/or no third-party vehicle-external signal.

6. The safety system as claimed in claim 4, wherein
   the microwave transmitter component is supplied with electrical power by a vehicle-internal energy source.

7. The safety system as claimed in claim 6, wherein
   the vehicle-internal energy source is a thermoelectric generator or a battery.

8. The safety system as claimed in claim 4, further comprising:
   a delay device configured to delay operation of the microwave transmitter component.

9. A motor vehicle, comprising:
   a safety system as claimed in claim 4; and
   at least one pressure container,
   wherein the safety system is configured to release pressure in the at least one pressure container.

10. The motor vehicle as claimed in claim 9, further comprising:
    at least one electrical connector for connecting a vehicle-external energy source in order to provide electrical power to the microwave transmitter component.

11. The motor vehicle as claimed in claim 9, further comprising:
    at least one distal vehicle-side coil and at least one proximal vehicle-side coil, wherein
    the distal vehicle-side coil is further away from the safety valve than the proximal vehicle-side coil, and
    the proximal vehicle-side coil is the microwave transmitter component configured to heat the at least one thermally activatable opening element.

12. The safety system for releasing pressure in the at least one pressure container of a motor vehicle, comprising:
    at least one thermally activatable safety valve which includes at least one microwave transmitter component and at least one thermally activatable opening element, the at least one microwave transmitter component being configured to heat the at least one thermally activatable opening element,
    wherein
    the microwave transmitter component is supplied with electrical power by a vehicle-external energy source, and
    the safety system is configured to release pressure in the at least one pressure container.

13. A motor vehicle comprising:
    at least one pressure container; and
    a safety system for releasing pressure in the at least one pressure container of the motor vehicle, the safety system including at least one thermally activatable safety valve which includes at least one microwave transmitter component and at least one thermally activatable opening element, the at least one microwave transmitter component being configured to generate heat to heat the at least one thermally activatable opening element; and
    at least two electrical connectors arranged at a distance from one another at different points of the motor vehicle,
    wherein the safety system is configured to release pressure in the at least one pressure container.

14. A method for releasing pressure in a pressure container, the method comprising the acts of:
    generating heat with at least one microwave transmitter component;
    heating, using the heat generated by at least one microwave transmitter component, a thermally activatable opening element of a thermally activated safety valve; and
    upon reaching a trigger temperature of the thermally activatable opening element of the thermally activatable safety valve, releasing pressure in the pressure container.

* * * * *